Feb. 20, 1934.   W. FISCHER   1,948,344
MANUFACTURE OF RUBBER HEELS
Filed June 10, 1931   4 Sheets-Sheet 1

Inventor
Wilhelm Fischer
By
Attorneys

Feb. 20, 1934.  W. FISCHER  1,948,344

MANUFACTURE OF RUBBER HEELS

Filed June 10, 1931  4 Sheets-Sheet 2

Inventor
Wilhelm Fischer

Attorneys

Feb. 20, 1934.    W. FISCHER    1,948,344
MANUFACTURE OF RUBBER HEELS
Filed June 10, 1931    4 Sheets-Sheet 3

Inventor
Wilhelm Fischer

By
Attorneys

Patented Feb. 20, 1934

1,948,344

UNITED STATES PATENT OFFICE 1,948,344

MANUFACTURE OF RUBBER HEELS

Wilhelm Fischer, Akron, Ohio, assignor to Wingfoot Corporation, Wilmington, Del., a corporation of Delaware Application June 10, 1931. Serial No. 543,310

13 Claims. (Cl. 18—4)

This invention relates to the manufacture of rubber heels, and it has particular relation to a method of and apparatus for manipulating the heels, and molds therefor, in a substantially automatic manner, prior to and subsequent to vulcanization.

One object of the invention is to provide an apparatus for conveying heel molds in an endless path, including devices for preparing the mold to receive the unvulcanized heels, and other devices for automatically removing the heels following vulcanization.

Another object of the invention is to provide an apparatus by means of which articles to be vulcanized in a mold, may be disposed in and removed from the latter, during a substantially continuous movement of the latter.

Another object of the invention is to provide an apparatus including conveying means for moving a mold in an endless path in such manner that the various operations required to prepare the mold for receiving unvulcanized heels and to remove such articles after vulcanization, may be performed during movement of the mold in such path.

Another object of the invention is to provide automatic means for opening and closing a sectional mold during its movement on a conveyor.

Another object of the invention is to provide automatic means for removing vulcanized heels from a mold.

Another object of the invention is to provide a method of manipulating heel molds by means of which various operations necessary to prepare the mold for receiving unvulcanized articles, may be performed in sequential order during movement of the mold by conveying means.

Another object of the invention is to provide a method of manipulating heel molds in an endless path, in such manner that the time required for manipulating the molds prior to and subsequent to vulcanization of the articles therein, is reduced to a minimum.

Another object of the invention is to provide a method of manipulating heel molds which reduces the number of manual operations usually required, by means of automatic devices controlled by movement of the molds.

Heretofore rubber heels have been manufactured by methods involving considerable manual labor. For example, where a sectional mold was employed, the sections were cleaned, sprayed and the sections assembled and disassembled manually. Nail retaining washers for the heels have been applied by a device similar to that disclosed in the patent to Schrock, No. 1,584,477 by manually moving the device over the section of the mold having pins for engaging the washers. Then the molds were manually moved into vulcanizing units, removed therefrom, the sections of the mold separated, and the articles removed. All of these operations were performed by workmen on platforms adjacent vulcanizing units.

According to this invention, various operations necessary to the preparation of molds for receiving articles to be vulcanized, are performed substantially automatically, by apparatus including means for transporting the molds in an endless path. The sections of the mold are pivotally connected at one end, and initially are separated and cleaned by devices automatically operated during movement of the mold on a conveyor. As the mold continues its movement, it operates a device which applies washers to the pins of one of the sections of the mold. Then unvulcanized rubber slugs are disposed in the cavities of the mold by hand, and immediately thereafter automatic devices controlled by the movement of the mold, assemble the sections preparatory to the mold being disposed in a vulcanizing unit. The vulcanizing unit is capable of accommodating a large number of molds and preferably a number of units are employed. While the molds in one or more units are subjected to vulcanizing pressure and temperature, the vulcanizing operation in another unit has in the meantime been completed and the molds are refilled. By means of suitable apparatus, an operator removes the molds from the latter unit successively, and such molds are delivered to a conveyor which in turn transports them to devices for separating the sections of the molds. Then automatic devices are employed to remove the vulcanized articles from the mold, following which the molds are conveyed to points where the previously described cleaning operations occur.

For a better understanding of the invention, reference may now be had to the accompanying drawings, forming a part of this specification in which.

Figure 1:
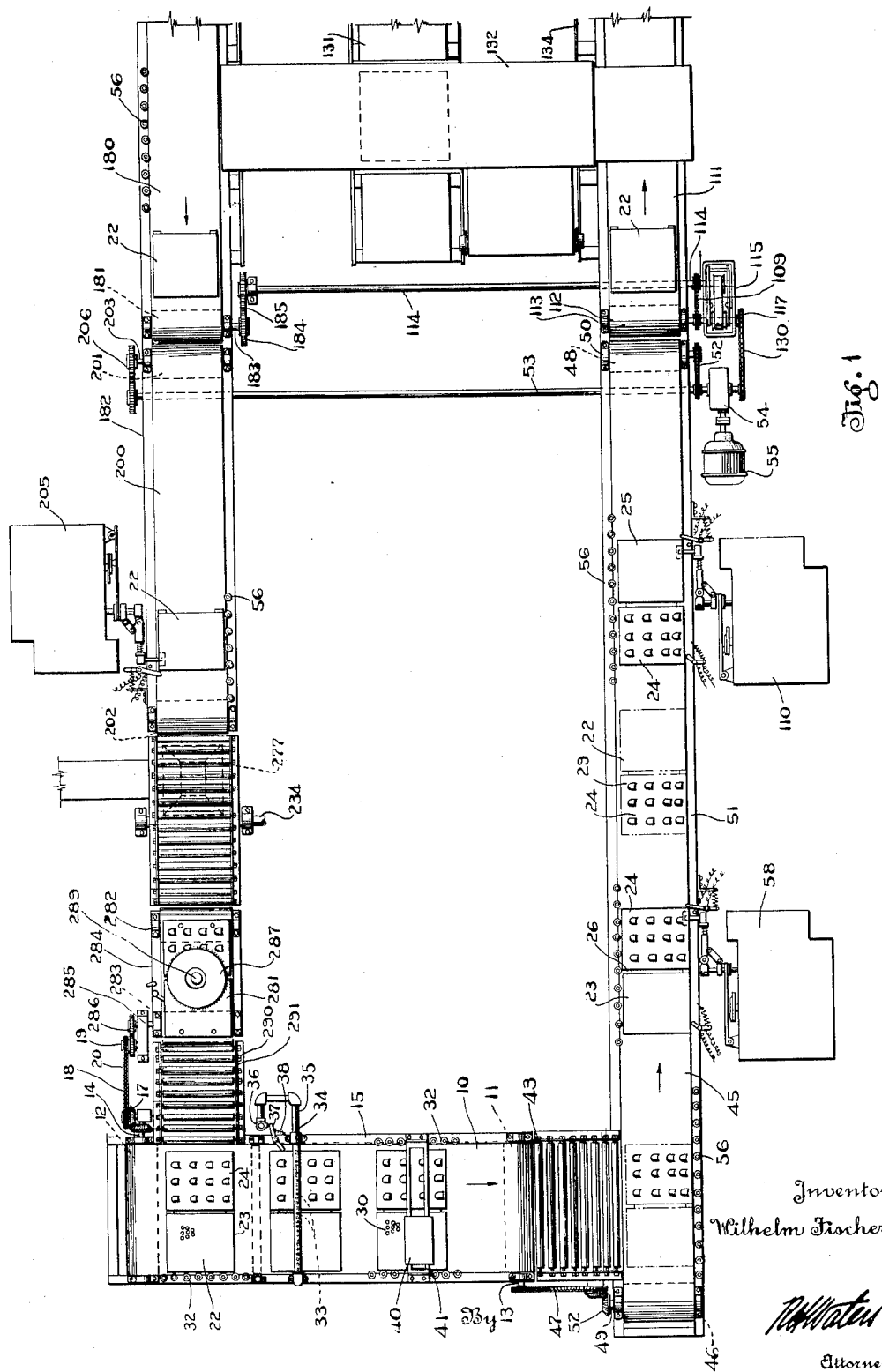
Fig. 1 is a plan view of a system constructed according to the invention.
Figure 4:
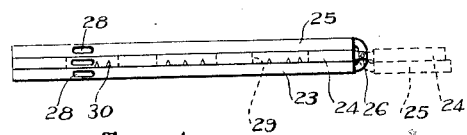
Fig. 4 is a side view of one of the molds for vulcanizing rubber articles employed in conjunction with the system.

Referring to Fig. 1, an endless conveyor 10 is provided which is trained about a pair of rollers 11 and 12 having shafts 13 and 14 respectively journaled in a framework 15. The upper side of the belt 10 travels from the roller 12 toward the roller 11 and is adapted to transport a mold 22 from a position adjacent the roller 12 to a position above the roller 11. As best shown by Fig. 4, the mold 22 comprises a lower section 23, an intermediate section 24, and an upper section 25, which are connected to a common pivot 26 that permits the sections 24 and 25 to be turned to the positions shown by broken lines. Each of the sections is provided with an elongated recess 28 which is utilized for controlling certain manipulations of the mold during its movement. Sections 23 and 25 of the mold have their adjacent surfaces formed to define the upper and lower surfaces of rubber heels, while section 24 has a series of cavities 29 adapted to define the periphery of the heels. Section 23 also is provided with a series of heel washer receiving pins 30 which project slightly into the openings 29 in section 24 when all of the sections are assembled in the manner shown in full lines by Fig. 4.

Initially, the mold 22 is disposed on the conveyor 10 adjacent the roller 12 in an open position, that is, sections 24 and 25 are disposed in the manner shown by broken lines in Fig. 4 while section 23 is in the position shown by full lines in that figure. As the mold is moved along by the conveyor, its edges are retained in properly aligned positions with respect to the edges of the conveyor by means of a series of vertically disposed rollers 32 disposed in suitable positions along the upper part of the framework 15. The mold first moves to a position beneath a spraying device 34 which comprises a conduit 35 extending across the framework 15, and above the conveyor. The conduit is connected by means of a valve 36 to a suitable source of cleaning fluid used for spraying the mold, and the lower side of the portion of the conduit 35 disposed above the belt 10 is provided with longitudinally spaced openings 33 through which the cleaning medium is sprayed. As the mold 22 moves toward the spraying device 34, its forward edge engages an arm 37 pivoted on the framework 15 which is adapted to open the valve 36 and permit the cleaning fluid to flow through the conduit 35. This valve is maintained open by engagement of the mold with the arm 37 during the time that the mold is beneath the conduit 35, and after the mold moves beyond the conduit, the arm 37 is returned to its normal position by means of a spring 38 connecting one end of the arm to the framework 15, thereby closing the valve.

Continued movement of the conveyor 10 moves the mold 22 under a device 40 adapted to apply a washer to each of the pins 30 on the section 23. The device 40 is mounted on a bar 41 connected to the upper side of the framework and which extends above the belt 10. Other details of the washer-applying mechanism may be similar to the device illustrated in the patent to Schrock, previously referred to. In other words, a washer-applying device substantially identical to that shown in the patent is stationarily mounted on a cross bar disposed above the conveyor belt 10. This reference to the details of the washer-applying device appears sufficient without further description.

Continued movement of the belt 10 carries the mold upon a series of rollers 43 having their ends journaled in the framework 15 beyond the roller 11. This series of rollers is inclined downwardly slightly from the roller 11, and, once the mold is disposed upon them, it moves downwardly by means of gravity. Movement of the mold beyond the lower roller 43 disposes it on a second endless conveyor 45 trained about rollers 46 and 48 mounted on shafts 49 and 50, respectively, journaled in a second framework 51 extending at right angles to the framework 15. The shaft 49 is connected by a bevel gearing 52 and a sprocket wheel-chain connection 47 to the shaft 13. The shaft 50 is connected by a sprocket wheel-chain connection 52 to a shaft 53 which in turn is connected by means of a reduction gearing 54 to a motor 55. Also, the framework 51 is provided with a series of rollers 56 vertically disposed at opposite sides of the framework to guide the mold 22 as it is moved by the belt 45.

Figure 2:
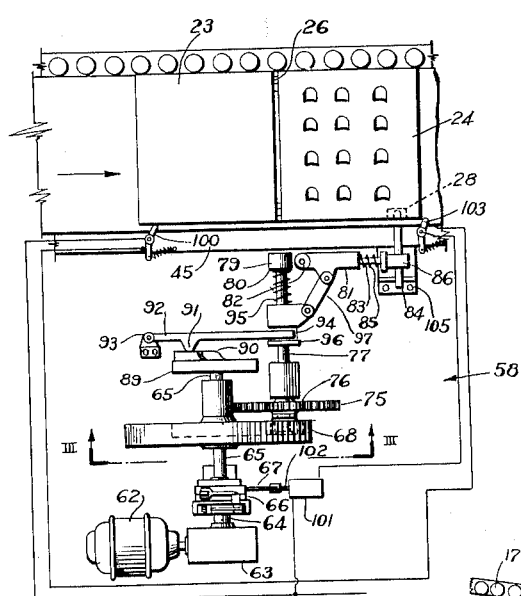
Fig. 2 is a fragmentary plan view on a larger scale of the apparatus shown by Fig. 1, for separating the sections of the mold during their movement on a conveyor forming part of the system.
Figure 3:
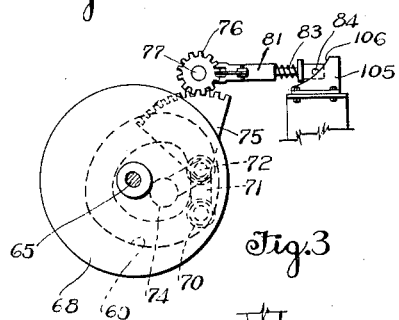
Fig. 3 is a cross-sectional view taken substantially along line III—III of Fig. 2.

The next operation to be performed on the mold 22 is that of turning the section 24 about the pivot 26 until it is in contact with the section 23. For effecting this result, a section turning device 58 controlled by the movement of the mold is provided, which is best shown by Fig. 2. According to this figure, a motor 62 is provided which is connected to a reduction gearing 63 having a shaft 64 projecting from one side thereof. The shaft 64 is adapted to be operatively connected to a second shaft 65 by what is known in the art as a one-revolution clutch 66. Clutches of this character are well known in the industry, and it does not appear necessary to describe one in detail if its operation be described generally. Normally, the shaft 65 is stationary and the shaft 64 rotating, and lever 67 operatively connected to the clutch 66, when operated connects the shafts 64 and 65 only during the time it requires for the shaft 65 to make one complete revolution. The shaft 65, as best shown by Fig. 3, is rigidly connected to a cam 68 having an internal cam groove 69. A cam roller 70 disposed in the groove 69, is journaled in one end of an arm 71 rigidly secured to a pivot 72. When the cam 68 is rotated through one revolution, the roller 70 and the arm 71 moves from the position indicated in Fig. 3, to the broken line position indicated at 74, and back again to the first position. The pivot 72 also is rigidly secured to a segmental gear 75 which meshes with a pinion 76 rigidly secured to a shaft 77 extending to a point adjacent the framework 51. That end of the shaft 77 adjacent the framework is rigidly secured to an arm 79 comprising a collar 80 having a sleeve 81 pivotally connected thereto as indicated at 82. The pivot 82 is so arranged that the sleeve 81 may be moved towards and from the framework 51. A rod 83 polygonal in cross-section and telescopically disposed in the sleeve 81, projects from the outer end of the latter and is rigidly connected to a pin 84 disposed parallel to the shaft 77. A spring 85 disposed between the outer end of the sleeve 81 and an enlarged portion 86 on the rod 83, and having its ends connected respectively to the sleeve and portion 86, normally retains the rod and sleeve in substantially definite relative positions. For definitely positioning the pin 84, a cam plate 105 is provided adjacent its outer end, having a cam surface 106 adapted to move the pin toward the shaft 77, when the rod 83 is moved to its normal position.

The shaft 65 also is connected to a cam 89 having a cam surface 90 adapted to engage a cam follower 91 integral with an arm 92 which is pivoted at one end as indicated at 93 to a stationary part of the framework. The free end of the arm 92 has a fork which is disposed in a groove 94 of a sleeve 96 slidably mounted on the shaft 77. The sleeve 96 normally is maintained in spaced relation with respect to the collar 80 by a spring 95 encircling the shaft 77 and disposed between the sleeve and the collar. The sleeve 96 is connected to the sleeve 81 by a link 97 pivotally connected at its ends to these members.

When the forward end of the mold 22 moving on the conveyor 45 reaches a position adjacent the device 58, it partially closes a normally open electrical switch 100 which is in the circuit of a solenoid 101, having a core 102 connected to the arm 67 adapted to operate the one revolution clutch 66. The circuit through the solenoid 101 is not completed by closing the switch 100 because a normally open switch 103 also in the circuit of the solenoid and switch 100, must also be closed, which is achieved when it is engaged by the mold. The switches 100 and 103 are spaced a distance slightly less than the length of the open mold and the switch 103 is closed by engaging the forward end of the mold only immediately prior to the time that the mold disengages the switch 100. Hence, the solenoid 101 is energized only for an instant, which is sufficient to operate the arm 67 and clutch 66. It should be understood that the clutch 66 automatically becomes inoperative after the shaft 65 has completed one revolution.

When the mold engages the switch 103 it closes a circuit to the solenoid 101 which causes the shaft 65 to be rotated through one revolution, and hence the gear segment 75 to be turned. Simultaneously, the cam 89 causes the arm 92 to be rocked about the pivot 93, the sleeve 96 to be moved longitudinally of the shaft 77 toward the framework 51, and by means of the link 97, the sleeve 81 and the rod 83 also to be moved toward the framework. This movement of the rod 83 causes the pin 84 to be moved toward the mold and into the recess 28 in the mold section 24. As the gear segment 75 begins to turn, thereby turning the shaft 77, the pin 84 lifts the mold section 24 and turns it about the pivot 26, and in conjunction with the movement of the section 24, by the conveyor 45, the latter is moved to a position in contact with the section 23. In view of the fact that the mold is moving at the same time that this operation occurs, the rod 83 necessarily is moved into the sleeve 81 in order to shorten the radius of movement of the pin 84. As the section 24 approaches the section 23, the cam 89 is in such position that the cam surface 90 is disengaged from the cam follower 91, and the spring 95 causes the sleeve 96 to be moved away from the mold, and, consequently, the pin 84 to be disengaged from the recess 28 in the section 24. Then the movement of the segmental gear 75 is reversed, causing the sleeve 81 and associated parts to resume their original positions.

After the mold has passed the section turning device 58, a workman manually disposes unvulcanized rubber heel slugs in the openings 29 of the mold section 24. Then the movement of the mold disposes it into a position adjacent a second mold section turning device 110 which is adapted to turn section 25 into contact with the previously turned section 24. In other words, the devices 58 and 110 successively turn sections 24 and 25 from their positions shown in broken lines by Fig. 4 to their positions shown by full lines in this figure. The mold now having unvulcanized rubber heel slugs in the recesses 29 is ready to be disposed in a vulcanizing unit.

Figure 8:
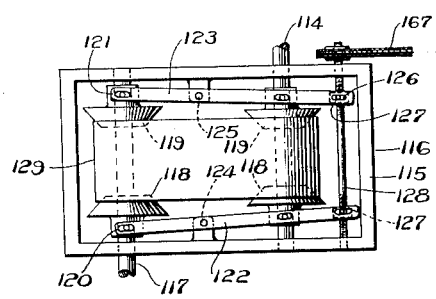
Fig. 8 is a plan view of a device for regulating the speed of a conveyor disposed adjacent the vulcanizing unit.

When the mold 22 reaches the end of the conveyor 45, it is moved upon a third conveyor 111 disposed in alignment with the first mentioned conveyor, which comprises an endless belt trained about a roller 112 and a second roller spaced therefrom which is not shown. The roller 112 is mounted on a shaft 113 journaled in the framework 51, which is connected by a sprocket wheel-chain connection 109 to a shaft 114 also journaled in the framework 51. The shaft 114 also forms part of a speed regulating device 115 which as best shown by Fig. 8, comprises a frame 116 having in addition to the shaft 114, a second shaft 117. Each of the shafts 114 and 117 is provided with a pair of rollers 118 and 119 having adjacent conical surfaces, which are integral respectively with sleeves 120 splined to their respective shafts. A pair of arms 122 and 123 pivoted at opposite sides of the frame 116 and intermediate their ends as indicated at 124 and 125 respectively, have at their opposite ends pins which project into circumferentially extending grooves 121 in the sleeves 120. One end of each arm 122 and 123 extends beyond the shaft 114 and are provided with elongate slots 126 which receive pins 127 rigidly connected to blocks 127 threaded on a rod 128 journaled at opposite ends in the framework 116. The blocks 127 engage oppositely threaded portions of the rod 128 and, consequently, when the latter is turned, the arms 122 and 123 move about the pivots 124 and 125 in opposite directions. In turn, this causes the rollers 118 and 119 on the shaft 117 to be moved toward each other for example, while the rollers on the shaft 114 are moved away from each other. An endless belt 129 having tapered edges, engages the conical faces of the rollers 118 and 119 on the shafts 114 and 117, and when the rollers 118 and 119 on the shaft 117 are moved apart, the belt is drawn nearer to the shaft 117, while movement of the rollers 118 and 119 on the shaft 114 toward each other causes the belt to be moved away from the latter shaft. In this manner the relative speeds of rotation of the shafts 114 and 117 may be varied. One end of the shaft 117 is connected as shown by Fig. 1, by means of a sprocket wheel-chain connection 130 to the shaft 53 which in turn is connected to the motor 55 by means of the reduction gearing 54. It is apparent that the motor drives the shaft 50 at a definite rate of speed, while it also drives the shaft 113 controlling the movement of the conveyor 111 at a speed which may be varied by means of the regulating device 115.

Figure 5:
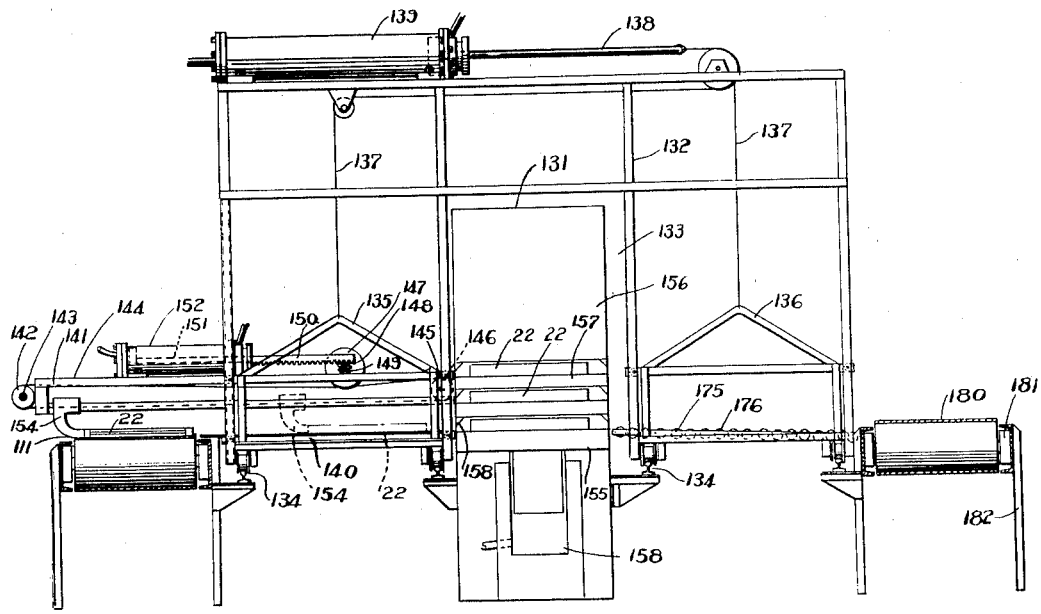
Fig. 5 is an end view of one of the vulcanizing units in the system, showing apparatus for moving molds into the unit, and removing them from the unit.
Figure 6:
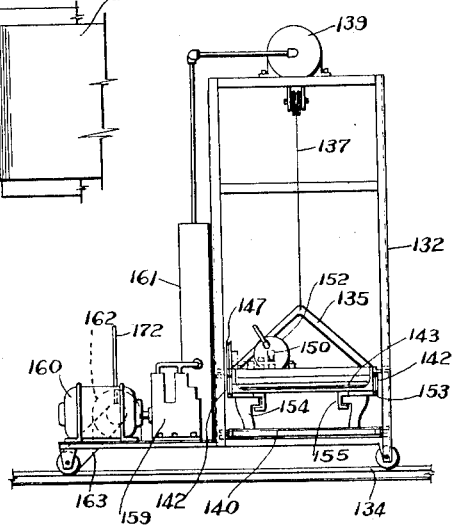
Fig. 6 is an end view taken from the left of the construction shown by Fig. 5.

The conveyor belt 111 extends alongside of a row of vulcanizing units 131 each of which can accommodate a number of molds 22. For removing the molds 22 from the conveyor, an apparatus is provided which is best shown by Figs. 5 and 6. Referring to Fig. 5, a framework 132 is provided which has a central open portion 133 partially enclosing the vulcanizing units 131 although permitting movement of the framework with respect to the unit. The framework 132 at opposite sides of the units 131 is mounted on trackways 134 by means of which it may be moved lengthwise of the conveyor 111 and also into a position adjacent any one of the vulcanizing units. At the sides of the open portion 133, the framework 132 is provided with elevators 135 and 136 connected by cables 137 trained over rollers at the top of the framework, to a piston rod 138 projecting from a cylinder 139. The cables are so trained about the rollers at the top of the framework that when the piston rod is moved the elevators are simultaneously moved vertically in the same direction. The elevator 24 is provided with a platform 140 adapted to support one of the molds 22, and when one of the molds is to be moved upon the platform, the elevators 135 and 136 are lowered until the platform is aligned with the upper side of the conveyor belt 111. A device for moving a mold 22 upon the platform 140 comprises an endless cable 141 trained about a roller 142 mounted on a shaft 143 journaled in a part 144 of the elevator 135, projecting over the conveyor belt 111. Also, the cable is trained about a roller 145 mounted on a shaft 146 journaled in the elevator 135 adjacent the open portion 133 of the framework and is looped about a roller 147 mounted on a shaft 148 journaled also in a part of the elevator 135. The shaft 148 is provided with a pinion 149 which meshes with a rack bar 150 forming an extension of a piston rod 151 extending into a cylinder 152, and, when fluid is admitted into the cylinder at either end, corresponding movement of the cable 141 occurs.

The shafts on which the rollers 142 and 145 are secured extend transversely of the elevator 135 and are provided with other and similar rollers at their other ends. A second cable 153 (Fig. 6) is trained about these rollers and accordingly is moved at the same time that the cable 141 is moved. Each of the cables 141 and 153 is connected to a mold engaging jaw 154 which, as best shown by Fig. 6, has a portion disposed in a channel guide 155 forming part of the elevator framework. The lower end of each jaw is provided with a lip adapted to engage one of the molds.

Each of the vulcanizing units, according to Fig. 5, can accommodate a plurality of molds, and comprises a vertically movable base 155, and a stationary head 156 spaced above it. The base 155 supports one mold, while others are supported by plates 157 disposed between the base and head 156. Brackets 157 at opposite sides of the unit, limit downward movement of each plate. The base 155 is moved by a fluid cylinder device 158.

The first mold is moved from the conveyor 111 by means of the jaws 154, across the platform 140 and into the space between the base 155 and the adjacent plate 157. The second mold is moved from the conveyor 111 to the platform 140, and then the elevator 135 is moved vertically until the platform is aligned with the space between the two plates 157. Similarly, the third mold may be disposed between the head 156 and the upper plate 157. Operation of the fluid cylinder device 158, causes movement of the base 155 and consequently, the application of pressure to the molds, which is necessary during vulcanization of rubber heels therein.

Suitable valve (not shown) for controlling operation of the cylinders 139 and 152, are mounted on the framework 132 in locations convenient to an operator who usually rides on such framework. For supplying fluid under pressure to the fluid cylinders 139 and 152 a compressor 159 is provided which is operated by a motor 160 (Fig. 6). Fluid under pressure is stored in a tank 161 which is connected by means of the valves to the cylinders 139 and 152.

For moving the framework 132 on the rails 134, a motor 162 is provided which is connected by a sprocket wheel-chain connection 163 to one of the rollers supporting the framework on the rails. A clutch (not shown) is disposed between the motor and sprocket wheel on the motor shaft and a lever 172 for operating the clutch is mounted in a convenient location where the operator may readily control the movement of the framework.

Figure 9:
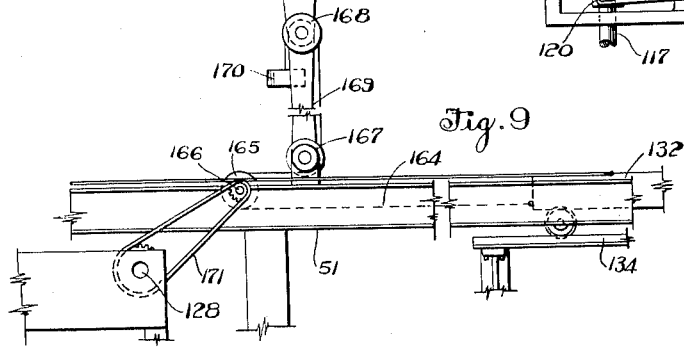
Fig. 9 is a view of a device associated with the apparatus shown by Fig. 5, adapted to control the speed regulator shown by Fig. 8, in an automatic manner.

According to Fig. 9, one end of the framework 132 is connected to one end of a cable 164, which is trained about a pulley 165 rigidly secured to a shaft 166 journaled in the framework 51. The cable extends over a second pulley 167 also mounted on the framework 51 and then upwardly and over a pulley 168, journaled in the upper end of a standard 169 projecting vertically above the framework. The end of the cable 164 is connected to a counterweight 170, and consequently, when the framework 132 is moved along the tracks 134, the cable 164 is moved about the pulley 165, causing rotation of the latter. The counterweight 170 causes the cable to reverse its movement when the framework 132 is moved in the opposite direction. This operation causes rotary movement of the pulley 165 in opposite directions depending in which direction the framework 132 is being moved. The shaft 166 also is connected by a sprocket wheel-chain connection 171 to the shaft 128, forming part of the speed regulating device 115. Consequently, the movement of the framework 132 in opposite directions causes rotation of the shaft 128 and variation of the speed of the conveyor belt 111. Controlling the speed of movement of the conveyor 111 by movement of the framework 132 harmonizes the movements of the conveyor with that of the framework. When the framework is moving toward the end of the conveyor 45, the speed of movement of the belt 111 is reduced, whereas when the framework is moving in the opposite direction, the speed of movement of the belt 111 is increased.

For the purpose of illustrating how the molds 22 are removed following vulcanization in one of the units 131, Fig. 5 is again referred to. Assuming that the molds 22 shown in the unit 131 have been subjected to a vulcanizing pressure and temperature for the required length of time, fluid is allowed to discharge from the lower end of the cylinder 158, thereby causing the base 155 and plates 157 to move downwardly. Then the operator removes a mold 22 from the conveyor belt 111 and moves it across the platform 140 and between the base 155 and the adjacent plate 157 causing the mold disposed between the base of the plate, to be moved out of the unit. As the mold 22 is discharged from the unit 131, it is moved upon an inclined framework 175 forming part of the elevator 125, having a series of rollers 176 for facilitating movement of the mold. It is apparent that when one of the molds is moved from the platform 140 on the elevator 135 into one of the mold spaces in the vulcanizing unit, that the framework 175 is in alignment with the platform at the opposite side of the unit and in a position to receive that mold ejected from the unit by the movement of the mold on the platform into the unit.

Figure 7:
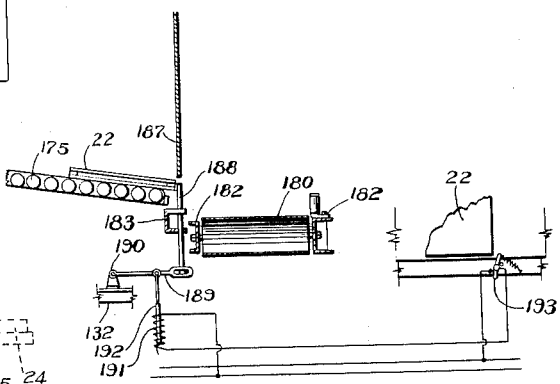
Fig. 7 illustrates a device for releasing molds at intervals from the apparatus shown by Fig. 5, which is controlled by movement of a mold previously released.

The molds are discharged from the elevator 125 upon an endless conveyor belt 180 disposed parallel to the belt 111. The belt 180 is trained about a roller 181 journaled in a framework 182 disposed parallel to the framework 51 and other rollers also journaled in the framework, which are not shown. The roller 181 is mounted on a shaft 183 (Fig. 1) having a pinion 184 which meshes with a pinion 185 on an extension of the shaft 114. The gear connection between the shaft 114 and the shaft 183, causes the belt 181 to be driven in a direction opposite to that in which the belt 111 is driven, although both belts are driven at a variable rate of speed controlled by movement of the framework 132. Molds on the elevator 136 are prevented from sliding therefrom, by a vertical bar 187 on the framework 132 (see Fig. 7), except when the framework is disposed in its lowermost position. Even when the elevator 136 is disposed in this position, normally the molds are prevented from leaving the elevator by a pin 188 slidably mounted in a bar 183 forming part of framework 132. The lower end of the pin 188 is connected to a link 189 pivoted to a part of the framework 132 as indicated at 190. A solenoid 191 having a core 192 connected to an intermediate part of the link 189 controls movement of the pin 188, and hence releasing of the mold. The solenoid 191 is in an electrical circuit which includes a switch 193 adapted to be closed by a mold 22 moving on the belt 180. Hence, a mold 22 on the framework 175 can not be released from the latter and disposed on the belt 180 until a preceding mold 22 has reached a position in which it closes the switch 193. This arrangement maintains the molds 22 on the belt 180 in spaced relation.

The mold 22 after it reaches the end of the belt 180 is moved upon another endless conveyor belt 200 disposed parallel to the belt 45. The belt 200 is trained about a roller 201 at one end, and about a second roller 202 at its other end, both of which are journaled in the framework 182. The roller 201 is provided with a shaft 203 which is connected by gearing 206 to the shaft 53. Just prior to the time that the mold 22 reaches the end of the belt 200 it moves into a position adjacent a mold section turning device 205 identical to the section turning devices 58 and 110, which is adapted to turn the section 25 of the mold until it rests on the conveyor belt 200. The next step in manipulating the mold comprises removing the vulcanized heels from the intermediate section 24 and reference will be had particularly to Figs. 10, 11, 12, and 13 illustrating such an apparatus in detail.

Figure 13:
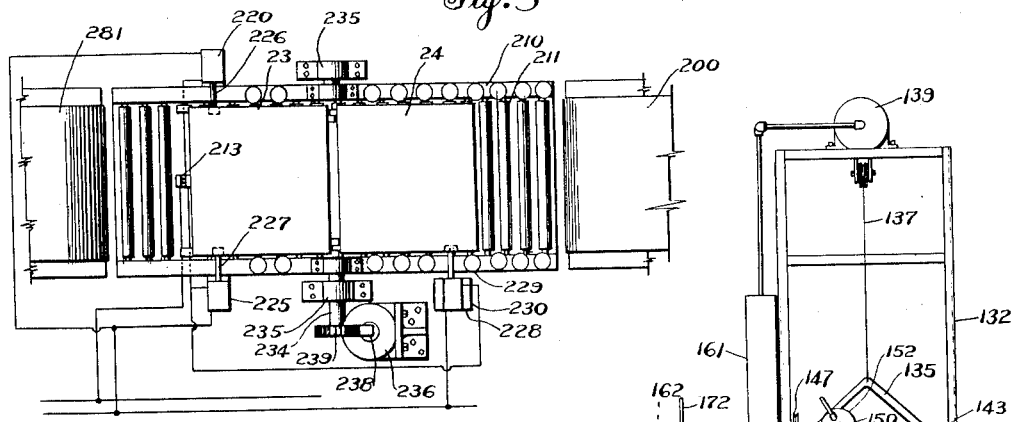
Fig. 13 is a plan view of the construction shown by Fig. 11.
Figure 11:
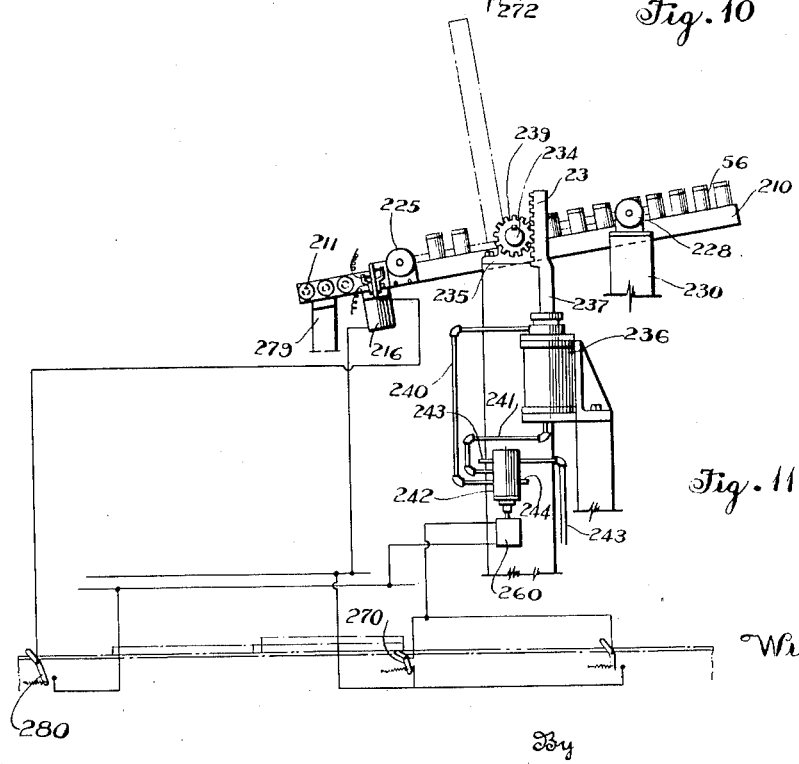
Fig. 11 is a view similar to that shown by Fig. 10 illustrating the apparatus at a different stage in its operation.

Referring to Fig. 13, this apparatus comprises a rectangular table frame 210 having a series of rollers 211 journaled in its side members. Normally the table is inclined downwardly with respect to the end of the belt 200 as best shown by Fig. 11, which causes the mold to move downwardly over the rollers 211. As the mold moves down over the table 210, the forward edge of the mold section 23, engages a pin 213 projecting above the surface of the table and between two of the rollers 211, which limits movement of the mold. The pin 213 is pivotally connected as indicated at 214 to a core 215 of a solenoid 216. When the mold engages the pin 213, the latter turns about the pivot 214 until a contact 217 on the pin engages a contact 218 formed on a bracket 219 rigidly connected to the core 215. A spring 220 normally retains the pin 213 in such position that the contacts 217 and 218 are separated. The contacts 217 and 218 are disposed in an electrical circuit shown by Fig. 13, and when engaged, close a circuit through a pair of solenoids 225 secured to opposite sides of the table 210. The solenoids are provided with cores 226 and 227 which are adapted, when the solenoids are energized, to project into the openings 28 in opposite sides of the mold section 23. A third solenoid 228 is secured to a standard 230 projecting vertically from the floor alongside the upper portion of the table 210 and is also in this circuit. Similarly, it is provided with a core 229 which, when the solenoid is energized, engages in the recess 28 in the mold section 24.

The table 210 intermediate its ends is secured to a shaft 234 journaled in a pair of standards 235 disposed at opposite sides of the table. When the cores 226 and 227 engage the mold section 23, and the core 229 engages the mold section 24, the table 210 may be turned with the shaft 234, while the sections 23 and 25 of the mold will be maintained in contact with the rollers 211, and the section 24 maintained in its original position because of its engagement with the core 229 mounted on the stationary standard 230. For turning the table, fluid cylinder device 236 (Fig. 11) is provided having a piston rod 237 projecting from its upper end which is provided with ratchet teeth 238 meshing with a pinion 239 secured to the shaft 234. Conduits 240 and 241 connected to opposite ends of the cylinder 236 communicate with a valve 242, provided with discharge conduits 243 and 244 and a fluid pressure supply conduit 245.

Figure 14:
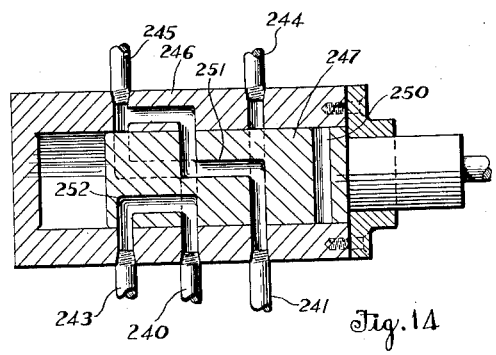
Fig. 14 is a cross-sectional view, on a larger scale, of a valve utilized in the construction shown by Fig. 11 for controlling the flow of fluid under pressure to a fluid cylinder device used in the construction.

As best shown by Fig. 14 the valve 242 comprises a cylinder 246 having a slide 247 disposed therein, which is provided with a transversely extending opening 250 adapted, when the slide is in one position, to connect the conduits 241 and 244. Also, the slide is provided with a zigzag opening 251 which is adapted to connect the conduit 245 with the conduit 241 in one position, and the conduit 245 with the conduit 240 when the slide is in another position. A third opening 252 in the slide is adapted to connect the conduits 243 and 240 when the slide is in one position. As the valve is shown, fluid under pressure passes through the conduit 245, the opening 251 in the slide, through the conduit 241, and into one end of the cylinder. This results in a movement of the piston, and the fluid on that side of the piston opposite the side of the fluid is acting upon, is discharged through the conduit 240, the opening 252 in the slide, and the discharge conduit 243. When the slide 247 is moved to the left end of the cylinder 246, fluid under pressure flows through the conduit 245, the conduit 251, which then connects the conduit 245 with the conduit 240, through the conduit 240, and into the opposite end of the cylinder 236. Fluid from the opposite end of the cylinder is discharged through the conduit 241, the opening 250 in the slide, and the conduit 244.

The slide 250 is moved by a solenoid 260, which is energized when a second mold on the conveyor belt 200 reaches a certain position. The manner in which the second mold controls the energization of the solenoid 260 is illustrated by Fig. 11. In this figure a normally open switch 270 is secured to the frame 182 in the path of movement of the second mold. When the mold engages this switch it closes the electrical circuit including the solenoid 260 thereby causing the slide 247 to move to such a position that the fluid supply conduit 245 is connected to the conduit 240 and the upper end of the cylinder 236. This causes a downward movement of the rod 236 and a substantially 90° turn of the table 210. It will be recalled that the mold section 24 is retained in its original position when the table is so turned, because of the engagement between the core 229 of the solenoid 228, with the recess 28 in the mold section 24. When the table has been turned 90°, it engages a stop 271 (Fig. 10) and at the same time closes an electrical switch 272 which is normally open. The switch 272 closes a circuit through a solenoid 273 disposed above the table 210 in such position that it is directly over the section 24 when a mold is on the table. A core 274 forming part of the solenoid 273 is provided with a plate 275 at its lower end having projections 276, each of which is aligned with one of the cavities 29 in the mold section 24. When the solenoid 273 is energized, the projections 276 are moved through the cavities 29, thereby forcing the vulcanized heels out of the section 24. The heels thus removed from the section 24 drop into a hopper 277 from which they may be conveyed to any suitable location.

Figure 12:
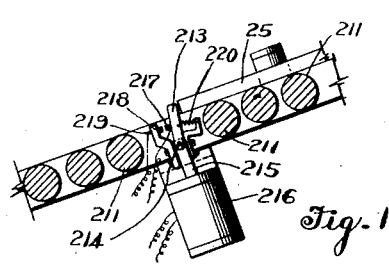
Fig. 12 is a fragmentary view on a larger scale of the construction shown by Fig. 11.
Figure 10:
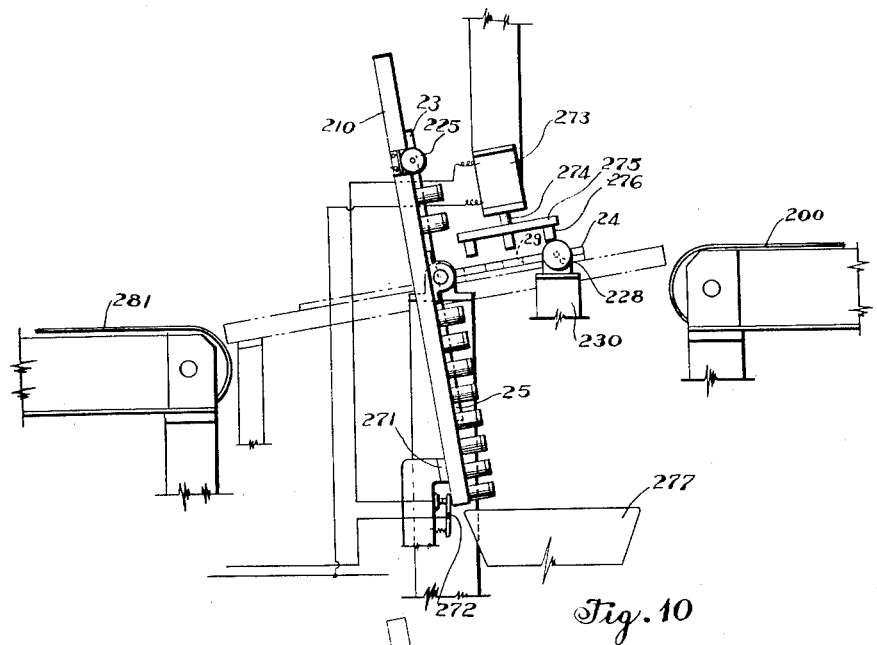
Fig. 10 is a fragmentary elevational view on a larger scale of a device for automatically removing the vulcanized articles from the molds.

After the second mold on the conveyor 200 moves beyond the switch 270, the circuit through the solenoid 260 is opened allowing the slide 247 to resume its original position, causing fluid pressure to flow through the conduits 245 and 241 into the lower end of the cylinder 246, thereby causing the table 210 to be returned to its normal position in which it is maintained by a stop 279. As the second mold continues its movement, it engages a second normally opened switch 280, and closes it. This switch completes a circuit through the solenoid 216 which causes, as best shown by Fig. 12, the pin 213 to be moved downwardly until it is free from engagement with the mold section 25. When the pin is so moved, the contact 217 is moved away from the contact 218 by means of the spring 220, thereby breaking the circuit through the solenoids 220, 225 and 228. Deenergization of the solenoids releases the mold and permits it to move downwardly on the rollers 211 and upon a fourth conveyor 281. It is apparent that the second mold which controls the operation of the device just described, subsequently will be moved upon the table 210 and the mold succeeding it utilized in controlling the movement of the heel removing apparatus.

The conveyor belt 281 as best shown by Fig. 1 is trained about a pair of rollers 282 and 283 journaled in a framework 284. The roller 283 is provided with a shaft 285 which is connected by gearing 286 to the shaft 19. As the mold moves over the conveyor 281 it is subjected to a scouring operation by means of a rotary brush 287 secured to a vertically disposed shaft 289 driven by a suitable motor not shown. If desired, a switch controlled by the movement of the mold on the conveyor 284 may so be utilized to control the operation of the shaft 289 that the brush is operated only during the time that a mold is on a conveyor. After this operation the mold is moved upon an inclined table 290 having a series of rollers 291 in its upper surface which facilitate movement of the mold downwardly and upon the conveyor 10 or the starting point in the system.

From the foregoing description, it is apparent that a system has been provided for greatly increasing the efficiency in the manufacture of heels, and particularly during that stage of manufacturing rubber heels when the heels are associated with molds. Such a system substantially automatically manipulates the molds prior to and subsequent to vulcanization of the heels therein. Numerous manual operations formerly required in the manufacture of rubber heels thereby become unnecessary, which factor in turn reduces the expense involved.

Although only the preferred form of the invention has been described and shown in detail, it will be apparent to those skilled in the art that the invention is not so limited but that various minor modifications may be made therein, without departing from the spirit of the invention or from the scope of the appended claims.

What I claim is:

1. An apparatus for manufacturing rubber articles in molds which comprises automatic means for conveying the molds in an endless path, means for preparing the mold to receive the unvulcanized rubber articles, means for vulcanizing the articles in the mold, and automatic means for removing the articles during one movement of the mold in said path, said last named means including automatic devices for opening and holding the mold and mechanism for punching the articles from the open mold.

2. An apparatus for manufacturing rubber articles in molds formed of sections pivotally secured together, which comprises power operated means for opening the molds by a pivotal movement of the respective sections and means for removing the articles from the molds when they are held by the power operated means.

3. An apparatus for manufacturing rubber articles in molds, which comprises means for conveying the molds in an endless path, means for vulcanizing articles in the molds at one point in the path of movement, and means for controlling the movement of the molds from the vulcanizing means to the conveying means to retain them in properly spaced relation.

4. An apparatus for manufacturing rubber articles in molds having pivoted sections, means for conveying the molds and means for separating the sections to open the molds during movement of the molds and means to close the molds during their movement by the conveyor.

5. An apparatus for manufacturing rubber articles in molds formed of sections pivotally secured together, which comprises automatic means for conveying the molds, means for pivotally opening them during their movement and automatic means for subsequently closing them during their movement.

6. An apparatus for manufacturing rubber articles in molds which comprises, a vulcanizing unit having a plurality of vertically spaced mold chambers, means for conveying the molds through the vulcanizing unit, means controlled by the movement of other molds outside the vulcanizing unit, for discharging molds from said unit, and means for controlling the height of said conveying means whereby the molds can be fed to any of the vertically spaced chambers.

7. An apparatus for manufacturing rubber articles in molds formed of sections pivotally secured together, which comprises mold supporting means, means for automatically opening the molds and disposing the section containing the articles in a plane at an angle to the plane in which another section is disposed, means controlling the operation of the mold opening means, and means for removing the articles while the sections are so disposed.

8. An apparatus for manufacturing rubber articles in sectional molds which comprises a movable mold manipulating framework, a conveyor, and means operated by the movement of the framework for controlling the movement of the conveyor.

9. An apparatus for manufacturing rubber articles in sectional molds, which comprises mold conveying means, means for cleaning the molds, means controlled by the contact of the mold therewith for controlling the operation of the cleaning means, means for assembling and disassembling the sections of the molds, means controlled by the contact of the mold therewith for controlling the assembling and disassembling means, and means for removing the articles after vulcanization, and means controlled by the contact of the mold therewith for controlling the article removing means.

10. An apparatus for manufacturing rubber articles in sectional molds, which comprises mold conveying means, automatically operated means for cleaning the molds, automatically operated means for assembling and disassembling the sections of the molds, automatically operated means for applying washers to pins in one of the mold sections.

11. Apparatus of the class described comprising a conveyor for moving molds past a mold loading station, means for automatically cleaning the molds before they pass to said loading station, and means for automatically closing the molds after they pass the loading station, said cleaning and closing means being independently controlled by the passing molds.

12. Apparatus of the class described comprising a conveyor for continuously moving hinged sectional molds in an endless path past a mold loading station, means for automatically cleaning the molds before they pass to said loading station, and means for automatically closing the molds after they pass the loading station, said cleaning and closing means including control elements disposed in the paths of the passing molds and actuated thereby.

13. Apparatus of the class described comprising a conveyor for moving molds past a mold loading station, means for automatically opening and emptying the molds before they reach the loading station, and means for automatically closing the molds after they pass the loading station, said opening and closing means being intermittently operable and controlled by the passing molds.

WILHELM FISCHER.